US010375730B2

(12) United States Patent
Kim et al.

(10) Patent No.: US 10,375,730 B2
(45) Date of Patent: Aug. 6, 2019

(54) METHOD AND APPARATUS FOR RECEIVING, BY TERMINAL, DATA ON UNLICENSED BAND

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/563,864

(22) PCT Filed: Apr. 14, 2016

(86) PCT No.: PCT/KR2016/003877
§ 371 (c)(1),
(2) Date: Oct. 2, 2017

(87) PCT Pub. No.: WO2016/167563
PCT Pub. Date: Oct. 20, 2016

(65) Prior Publication Data
US 2018/0077724 A1 Mar. 15, 2018

Related U.S. Application Data

(60) Provisional application No. 62/148,150, filed on Apr. 15, 2015.

(51) Int. Cl.
*H04W 16/14* (2009.01)
*H04W 28/02* (2009.01)
(Continued)

(52) U.S. Cl.
CPC ....... *H04W 74/0808* (2013.01); *H04W 16/14* (2013.01); *H04W 28/02* (2013.01);
(Continued)

(58) Field of Classification Search
CPC ......................... H04W 74/0808; H04W 48/16; H04W 16/14; H04W 76/12; H04W 88/06; H04W 74/08; H04W 28/02; H04W 74/00
See application file for complete search history.

(56) References Cited

U.S. PATENT DOCUMENTS 9,338,789 B2 * 5/2016 Wang ................ H04W 72/0413
9,565,593 B2 * 2/2017 Bhushan .............. H04W 76/15
(Continued)

FOREIGN PATENT DOCUMENTS

WO 2014/182090 A1 11/2014

OTHER PUBLICATIONS

R1-150504, 3GPP TSG RAN WG1 Meeting #80, Athens, Greece, Feb. 9-13, 2015, "Hidden Node Problem and Potential Remedies for LAA Downlink", Intel Corporation (Year: 2015).*
(Continued)

*Primary Examiner* — Brian T O Connor
(74) *Attorney, Agent, or Firm* — Dentons US LLP

(57) ABSTRACT

Provided are a method for receiving, by a terminal, data on an unlicensed band in a wireless communication system, and an apparatus for supporting the same. The terminal receives, from a base station, a first indicator which indicates existence of data to be transmitted to the terminal; receives a timer value from the base station; performs channel sensing in a section where a timer operates; and can transmit, to the base station on the basis of the result of performing channel sensing, either one of a second indicator, which indicates that reception of data is possible, and a third indicator, which indicates that reception of data is impossible.

14 Claims, 16 Drawing Sheets

(51) Int. Cl.

| | |
|---|---|
| ***H04W 48/16*** | (2009.01) |
| ***H04W 74/00*** | (2009.01) |
| ***H04W 74/08*** | (2009.01) |
| ***H04W 76/12*** | (2018.01) |
| ***H04W 88/06*** | (2009.01) |

(52) U.S. Cl.

CPC ........... *H04W 48/16* (2013.01); *H04W 74/00* (2013.01); *H04W 74/08* (2013.01); *H04W 74/0816* (2013.01); *H04W 76/12* (2018.02); *H04W 88/06* (2013.01)

(56) References Cited

U.S. PATENT DOCUMENTS

| | | | | |
|---|---|---|---|---|
| 9,674,825 | B2 * | 6/2017 | Yerramalli | H04W 74/002 |
| 10,051,478 | B2 * | 8/2018 | Guo | H04W 16/14 |
| 2014/0003414 | A1 | 1/2014 | Choudhury et al. | |
| 2014/0004865 | A1 | 1/2014 | Bhargava et al. | |
| 2014/0341018 | A1 | 11/2014 | Bhushan et al. | |
| 2015/0023315 | A1 | 1/2015 | Yerramalli et al. | |
| 2015/0139083 | A1 * | 5/2015 | Kneckt | H04W 74/0816 370/329 |
| 2016/0157230 | A1 * | 6/2016 | Nord | H04L 1/1861 370/329 |
| 2017/0048879 | A1 * | 2/2017 | Zhang | H04W 52/146 |
| 2017/0118771 | A1 * | 4/2017 | Kazmi | H04W 16/14 |
| 2017/0295499 | A1 * | 10/2017 | Guo | H04W 16/14 |
| 2017/0303312 | A1 * | 10/2017 | Agiwal | H04W 24/08 |
| 2017/0339693 | A1 * | 11/2017 | Cierny | H04W 16/14 |
| 2018/0054741 | A1 * | 2/2018 | Froberg | H04W 16/14 |
| 2018/0124749 | A1 * | 5/2018 | Park | H04W 16/14 |

OTHER PUBLICATIONS

R1-150369, 3GPP TSG RAN1 #80, Athens, Greece, Feb. 9-13, 2015, "Discussion on LAA Hidden Node Issue", Samsung (Year: 2015).*

Institute for Information Industry (III), "Design of LAA-WiFi Hidden Terminal Mitigation", R1-151972, 3GPP TSG-RAN WG1 Meeting #80bis, Belgrade, Serbia, Apr. 20-24, 2015, pp. 1-5.

Cisco Systems, "The Impact of hidden nodes on a downlink LAA-only network", R1-151815, 3GPP TSG RAN WG1 #80bis, Belgrade, Serbia, Apr. 20-24, 2015, pp. 1-10.

Cisco Systems, "The impact of hidden nodes on downlink LAA-Wi-Fi coexistence", R1-151816, 3GPP TSG RAN WG1 #80bis, Belgrade, Serbia, Apr. 20-24, 2015, pp. 1-11.

Huawei, HiSilicon, "Discussion of hidden node problem of LAA", 3GPP TSG RAN WG1 Ad-hoc Meeting, Mar. 24-26, 2015, R1-151123.

Alcatel-Lucent Shanghai Bell, Alcatel-Lucent, "Hidden node problem and potential solutions for LAA", 3GPP TSG RAN NG1 Meeting #79, Nov. 17-21, 2014, R1-144703.

Intel Corporation, "Hidden Node Problem and Potential Remedies for LAA Downlink", 3GPP TSG RAN WG1 Meeting Ad-hoc, Mar. 24-26, 2015, R1-151106.

* cited by examiner (a)

(b)

(a)

(b)

(a)

(b)

METHOD AND APPARATUS FOR RECEIVING, BY TERMINAL, DATA ON UNLICENSED BAND

CROSS-REFERENCE TO RELATED APPLICATIONS

This application is the National Stage filing under 35 U.S.C. 371 of International Application No. PCT/KR2016/003877, filed on Apr. 14, 2016, which claims the benefit of U.S. Provisional Application No. 62/148,150 filed on Apr. 15, 2015, the contents of which are all hereby incorporated by reference herein in their entirety.

BACKGROUND OF THE INVENTION

Field of the Invention

The present invention relates to a wireless communication system, and more particularly, to a method of receiving data by a UE on an unlicensed band in the wireless communication system, and an apparatus supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Recently, with an increase in data traffic usage, methods have been required that sufficiently satisfy the demand on data use from customers without involving large-scale investment in facilities or a huge increase in communication fees. Accordingly, in order to cope with a data explosion, a large number of wireless service carriers adopt one solution of offloading wireless data traffic concentrating on 3G or LTE networks by utilizing a WLAN communication method available in an unlicensed band, such as the ISM bands.

An unlicensed band is characterized in that since wireless service carriers do not need to obtain the exclusive right to use frequencies in this band through an auction process or the like, an elaborately-designed WLAN is capable of handling significant levels of capacity at remarkably low costs in this band, as compared with a network established in a licensed band. However, since large numbers of communication equipment may be used in an unlicensed band without restriction under rules associated with a certain level of adjacent band protection and in-band interference, a communication service using the unlicensed band may not guarantee as high communication quality as a communication service through a licensed band within the exclusive right can provide. In addition, although standardization for interworking HSPA or LTE services as 3GPP technologies with Wi-Fi as an IEEE technology has been in progress since 2002, it is difficult to completely integrate two networks with different network structures and to provide a service in view of handover and guaranteed QoS.

In order to solve these problems, LTE technology in an unlicensed band (LTE on unlicensed spectrum (LTE-U) or U-LTE) has been actively discussed recently.

SUMMARY OF THE INVENTION

A hidden node problem may occur in an environment where an unlicensed LTE cell and a WLAN AP co-exist. The conventional request to send (RTS)/clear to send (CTS) procedure may have difficulty in solving the hidden node problem which may occur in the environment where the unlicensed LTE cell and the WLAN AP co-exist when coverage of CTS is considered. Accordingly, the present invention proposes a method of receiving data by a UE on an unlicensed band, and an apparatus supporting the method.

According to one embodiment, a method of receiving data by a UE on an unlicensed band in a wireless communication system is provided. The method may include: receiving, from a base station, a first indicator indicating a presence of data to be transmitted to the UE; receiving a timer value from the base station; performing channel sensing in a duration in which a timer runs; and transmitting, to the base station, any one of a second indicator indicating that it is possible to receive data on the basis of a result of performing the channel sensing and a third indicator indicating that it is impossible to receive data. The first indicator may be received by being included in at least any one of an RRC message, a MAC control element, and a PDCCH.

The method may further include: transmitting, by the UE to the base station, the second indicator when it is determined that a channel is not in use as the result of performing the channel sensing. The second indicator may be transmitted by using at least any one of a WLAN module and an LTE module.

The method may further include: receiving, by the UE, a fourth indicator indicating whether transmission of the second indicator is necessary. The second indicator may be transmitted only when the fourth indicator indicates that transmission of the second indicator is necessary. The fourth indicator may be received through at least any one of a WLAN and an LTE cell.

The method may further include: receiving, by the UE from the base station, data through an SCell on an unlicensed band in response to the second indicator.

The method may further include: transmitting, by the UE to the base station, the third indicator if it is determined that a channel is in use as the result of performing the channel sensing. The timer may be initiated after the UE receives the first indicator. The initiated timer may expire after time elapses by the timer value. The third indicator may be transmitted after the timer expires. The third indicator may be transmitted to the base station by using an LTE module through an LTE cell on an unlicensed frequency or a licensed frequency. The second indicator may not be transmitted to the base station.

The method may further include: receiving, by the UE from the base station, a fifth indicator indicating a presence of data to be transmitted to the UE in response to the third indicator. A receiver address of the first indicator and a receiver address of the fifth indicator may be different from each other.

According to another embodiment, a UE for receiving data on an unlicensed band in a wireless communication system is provided. The UE may include: a memory; a transceiver; and a processor operatively coupled to the memory and the transceiver. The processor may be configured for: controlling the transceiver to receive, from a base station, a first indicator indicating a presence of data to be transmitted to the UE; controlling the transceiver to receive a time value from the base station; performing channel sensing in a duration in which a timer runs; and controlling the transceiver to transmit, to the base station, any one of a second indicator indicating that it is possible to receive data on the basis of a result of performing the channel sensing and a third indicator indicating that it is impossible to receive data.

It is possible to solve a hidden node problem or the like which may occur in a environment where an unlicensed LTE cell and a WLAN AP co-exist.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-1-DMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
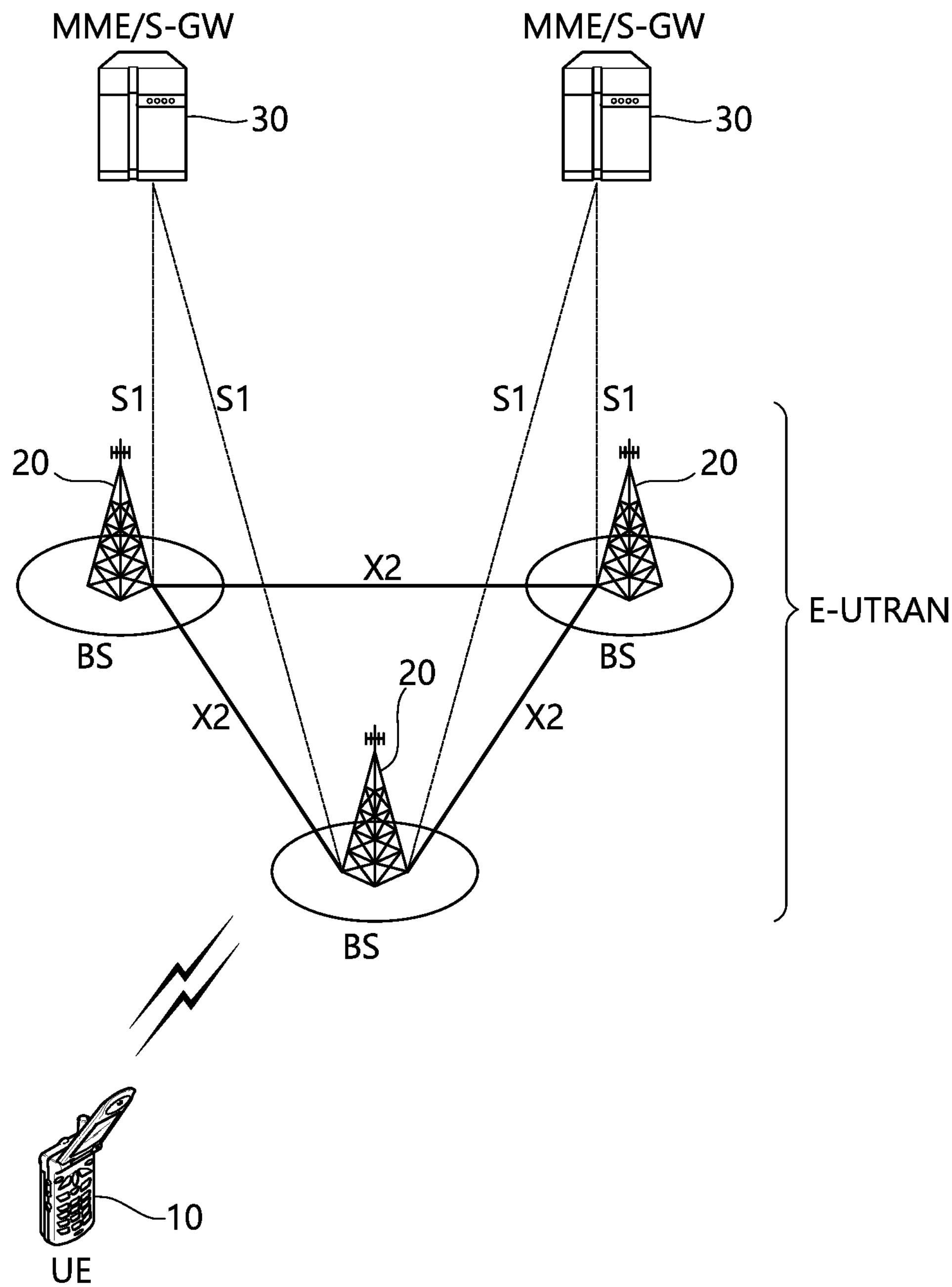
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
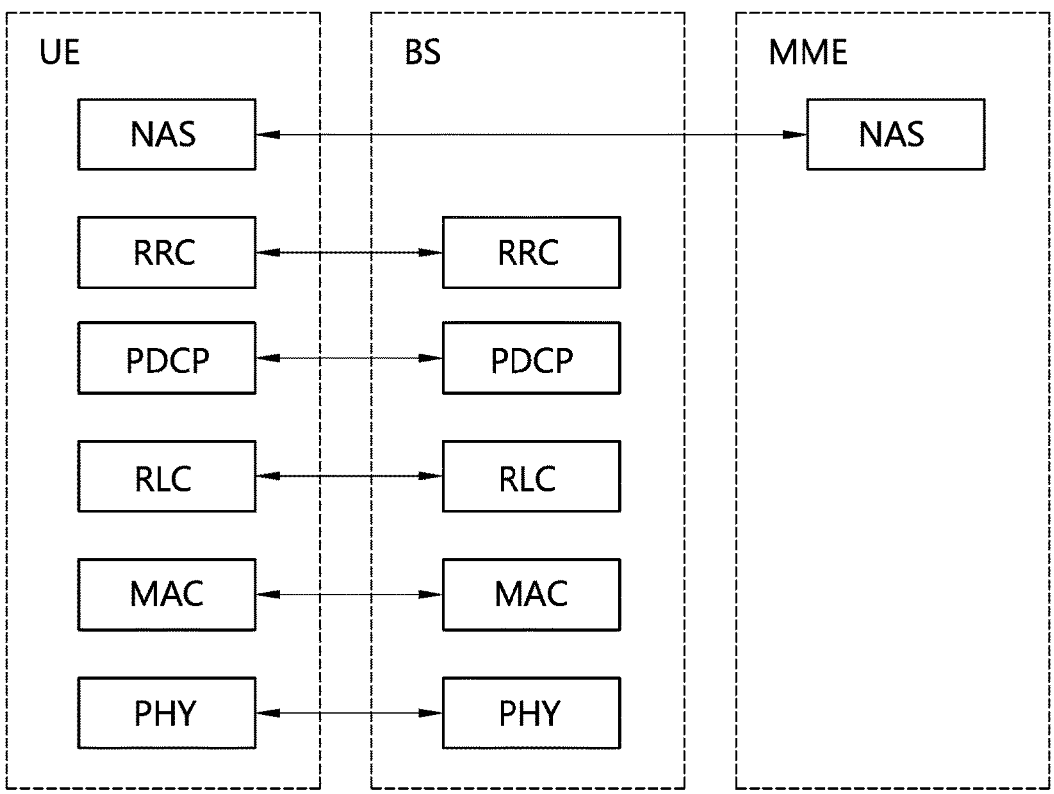
FIG. 2 shows a control plane of a radio interface protocol of an LTE system.
Figure 3:
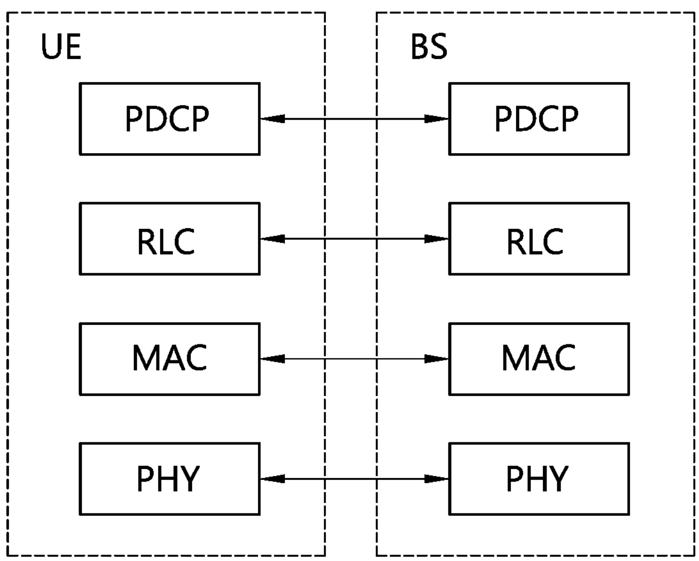
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
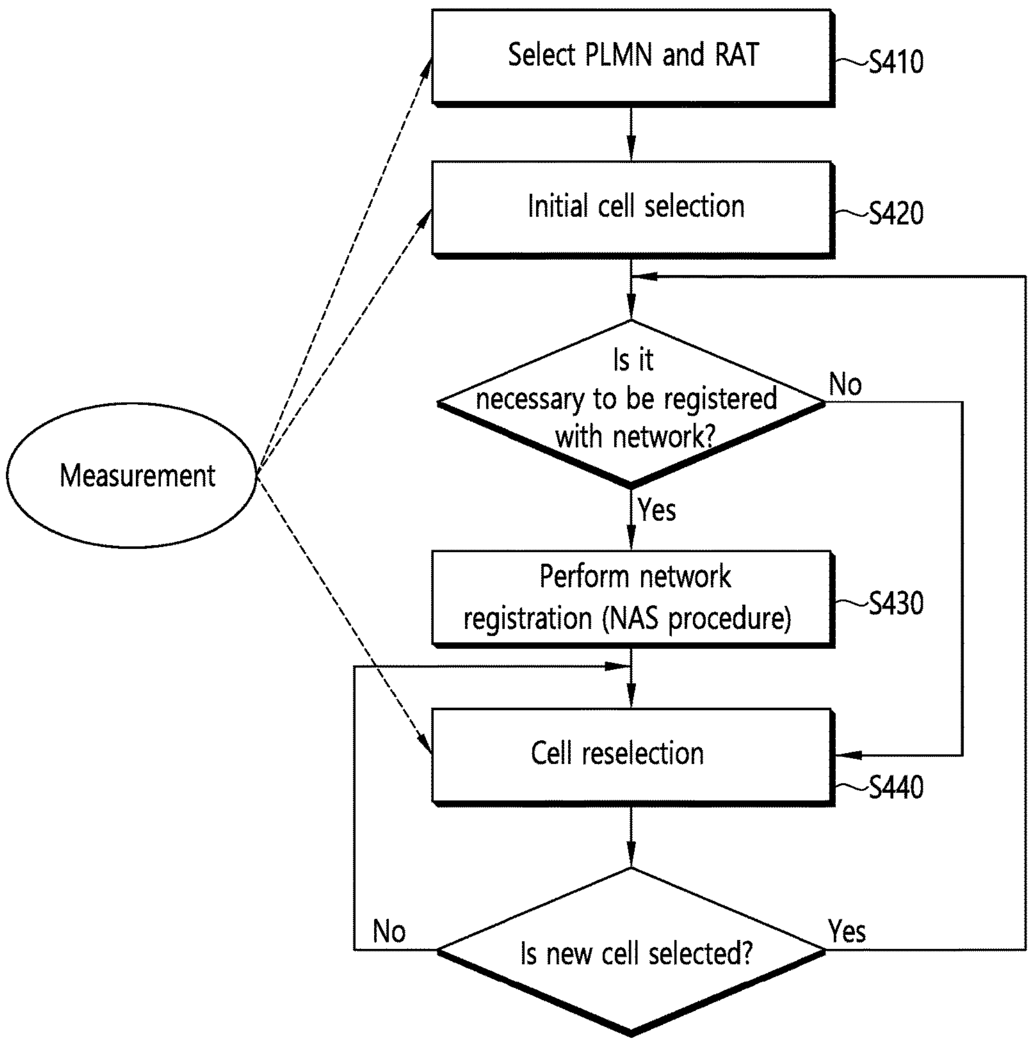
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
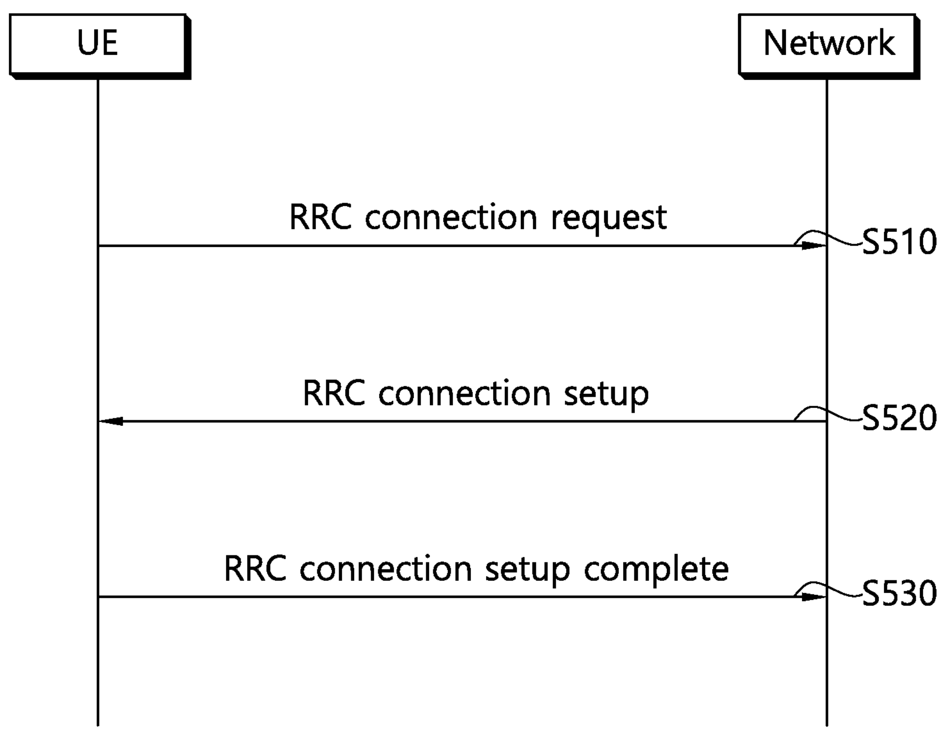
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
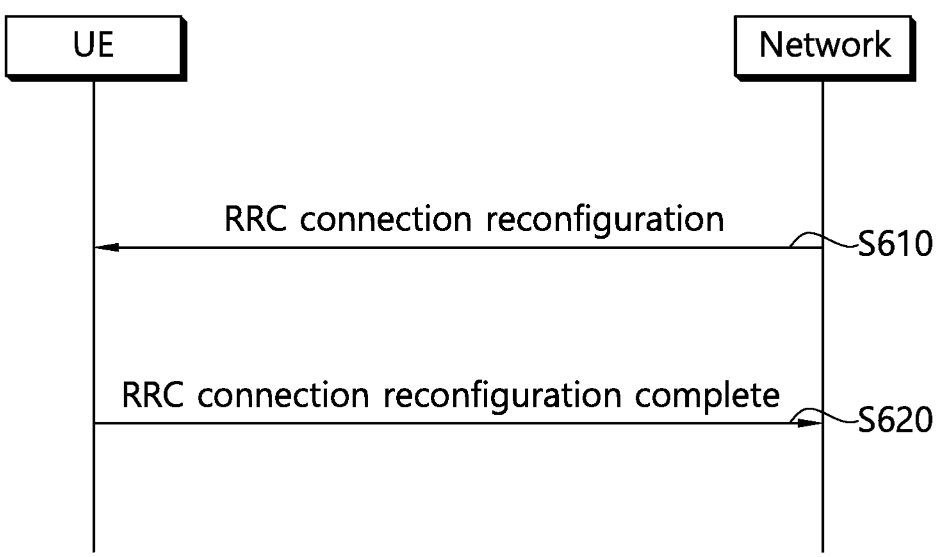
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a suitable quality cell. For example, a UE where power is turned-on just before should select the suitable quality cell to be registered in a network. If the UE in an RRC connection state enters in an RRC idle state, the UE should selects a cell for stay in the RRC idle state. In this way, a procedure of selecting a cell satisfying a certain condition by the UE in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the UE.

Hereinafter, a method and a procedure of selecting a cell by a UE in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S=Q_{meas,s}+Q_{hyst},\ R_n=Q_{meas,n}-Q_{offset} \quad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
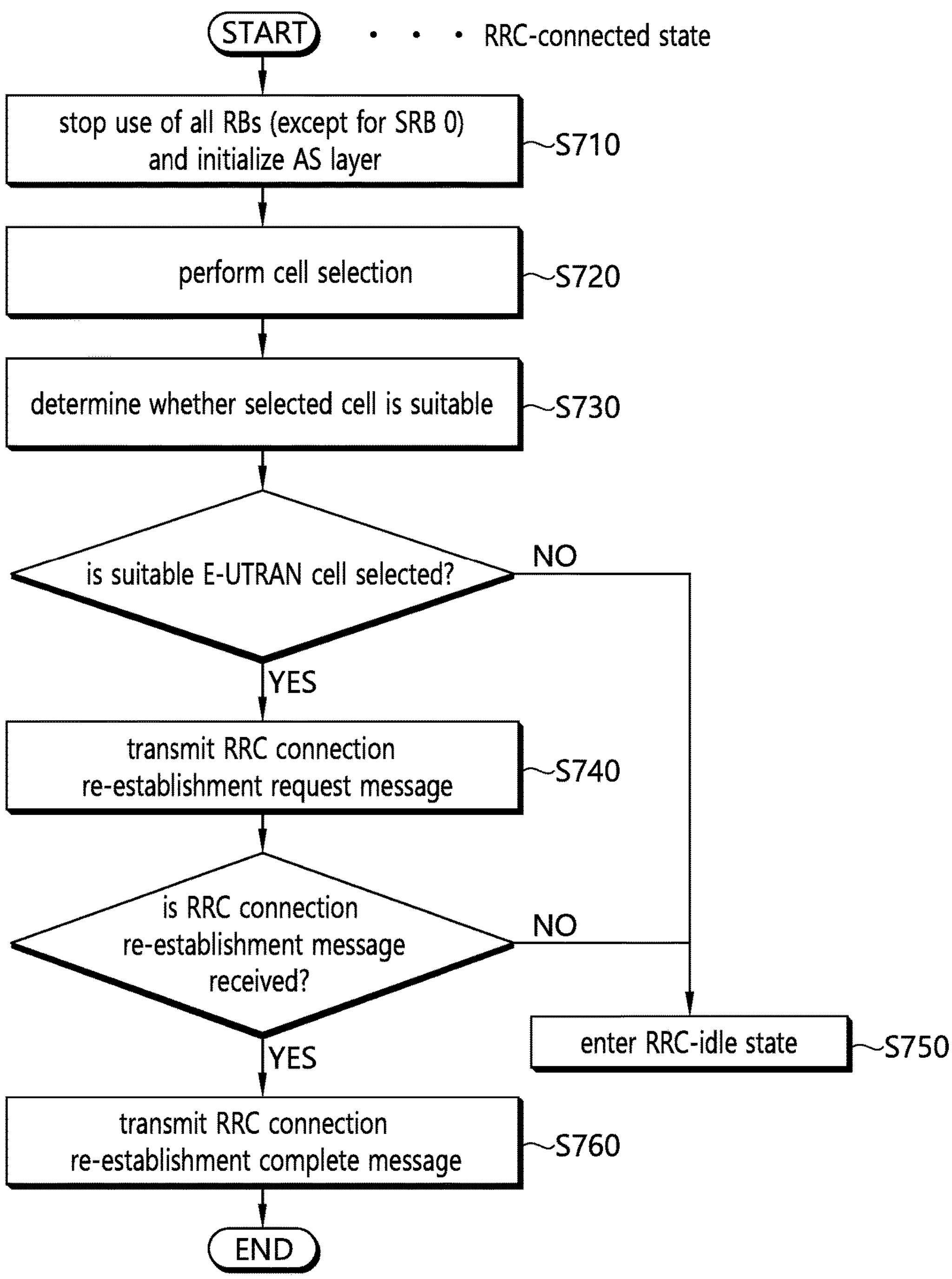
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
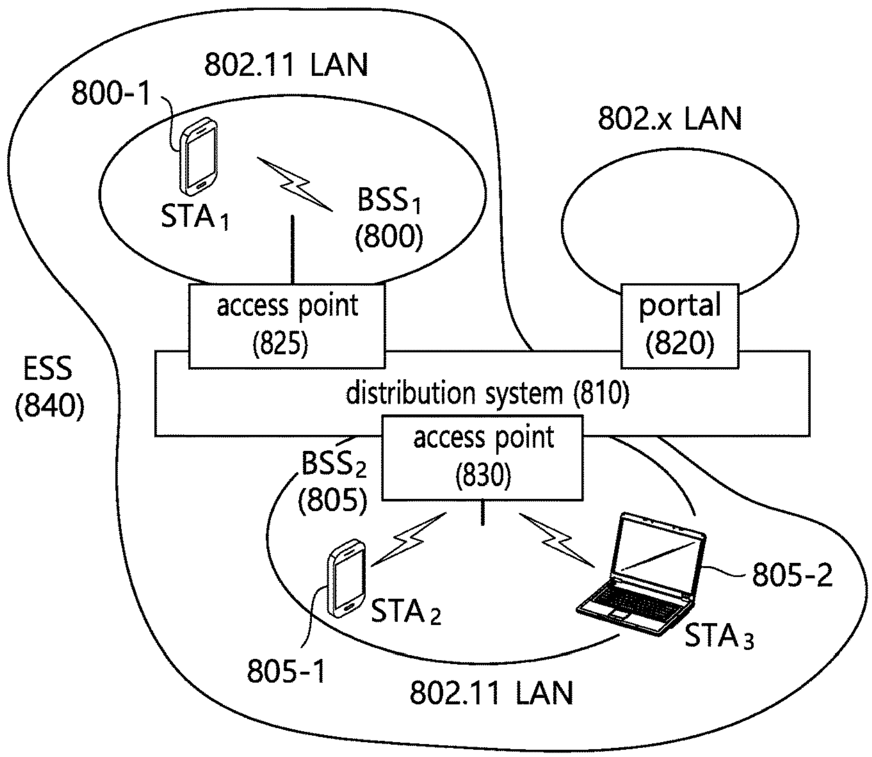
FIG. 8 shows the structure of a wireless local area network (WLAN)
Figure 8:
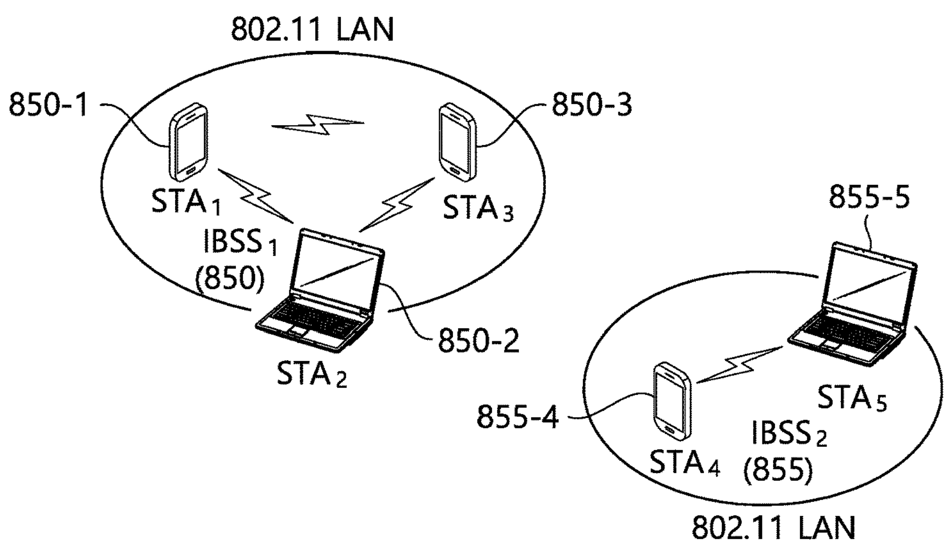

FIG. 8 shows the structure of a wireless local area network (WLAN). FIG. 8(*a*) illustrates the structure of an infrastructure network of Institute of Electrical and Electronics Engineers (IEEE) 802.11. FIG. 8(*b*) illustrates an independent BSS.

Referring the FIG. 8(*a*), a WLAN system may include one or more basic service sets (BSSs) 800 and 805. The BSSs 800 and 805 are a set of an access point (AP) and a station (STA), such as an AP 825 and STA1 800-1, which are successfully synchronized to communicate with each other, and are not a concept indicating a specific region. The BSS 805 may include one AP 830 and one or more STAs 805-1 and 805-2 that may be connected to the AP 830.

An infrastructure BSS may include at least one STA, APs 825 and 830 providing a distribution service, and a distribution system (DS) 810 connecting a plurality of APs.

The distribution system 810 may configure an extended service set (ESS) 840 by connecting a plurality of BSSs 800 and 805. The ESS 840 may be used as a term indicating one network configured by connecting one or more APs 825 or 830 through the distribution system 810. APs included in one ESS 840 may have the same service set identification (SSID).

A portal 820 may serve as a bridge that connects the WLAN (IEEE 802.11) and another network (for example, 802.X).

In the infrastructure network illustrated in the FIG. 8(*a*), a network between the APs 825 and 830 and a network between the APs 825 and 830 and the STAs 800-1, 805-1, and 805-2 may be configured. However, it is possible to configure a network between STAs in the absence of the APs 825 and 830 to perform communication. A network configured between STAs in the absence of the APs 825 and 830 to perform communication is defined as an ad hoc network or independent basic service set (BSS).

Referring to FIG. 8(*b*), an independent BSS (IBSS) is a BSS that operates in an ad hoc mode. The IBSS includes no AP and thus has no centralized management entity that performs a management function at the center. That is, in the IBSS, STAs 850-1, 850-2, 850-3, 855-4, and 855-5 are managed in a distributed manner. In the IBSS, all STAs 850-1, 850-2, 850-3, 855-4, and 855-5 may be mobile STAs. Further, the STAs are not allowed to access the DS and thus establish a self-contained network.

An STA is a functional medium including medium access control (MAC) and a physical layer interface for a radio medium according to IEEE 802.11 specifications and may be used to broadly mean both an AP and a non-AP STA.

An STA may also be referred to as various names, such as a mobile UE, a wireless device, a wireless transmit/receive unit (WTRU), user equipment (UE), a mobile station (MS), a mobile subscriber unit, or simply a user.

Hereinafter, a medium access mechanism is described.

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF inter-frame space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

The CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access (or channel access) of the STA which receives the NAV value is prohibited or deferred during that period of time. The NAV may be set according to the value of the "duration" field of a MAC header of a frame.

A robust collision detection mechanism for reducing collision has been introduced, which will be described with reference to FIGS. 9 and 10. Although a transmission range may not be equal to an actual carrier sensing range, for convenience, assume that the transmission range may be equal to the actual carrier sensing range.

Figure 9:
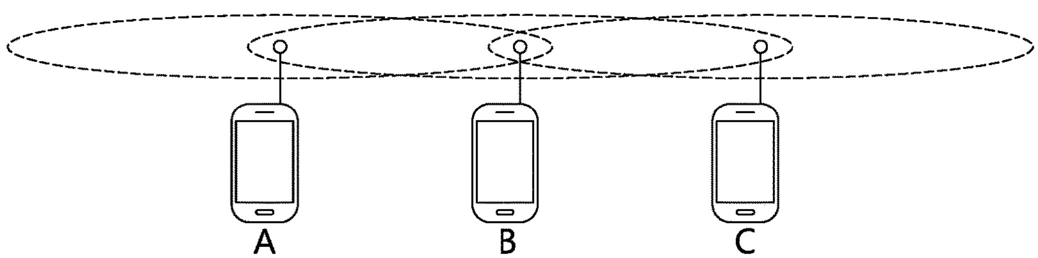
FIG. 9 shows an example of a hidden node and an exposed node.
Figure 9:
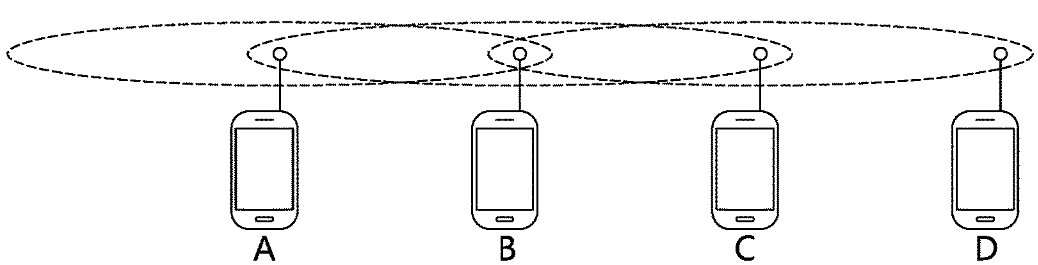

FIG. 9 shows an example of a hidden node and an exposed node. FIG. 9(*a*) shows an example of a hidden node, and FIG. 9(*b*) shows an example of an exposed node.

In FIG. 9(*a*), it is assumed that an STA A and an STA B are communicating, and an STA C has information to be transmitted. In this case, although the STA A is transmitting information to the STA B, it may be determined that a medium is in an idle state when carrier sensing is performed before the STA C sends data to the STA B. This is because transmission (i.e., medium occupation) of the STA A may not be able to be sensed at a location of the STA C. In this case, collision may occur since the STA B receives information of the STA A and the STA C simultaneously. At this time, the STA A may be a hidden node of the STA C.

In FIG. 9(*b*), it is assumed that an STA B is transmitting data to an STA A, and an STA C has information to be transmitted to an STA D. In this case, if the STA C performs carrier sensing, it may be determined as a state in which a medium is occupied due to transmission of the STA B. Accordingly, since it is sensed as a medium occupation state even if the STA C has information to be transmitted to the STA D, the STA C needs to wait until the medium is in an idle state. However, in practice, since the STA A is present out of a transmission range of the STA C, transmission from the STA C and transmission from the STA B may not collide from a perspective of the STA A. Therefore, it may be unnecessary for the STA C to wait until the STA B stops transmission. In this case, the STA C may be an exposed node of the STA B.

Figure 10:
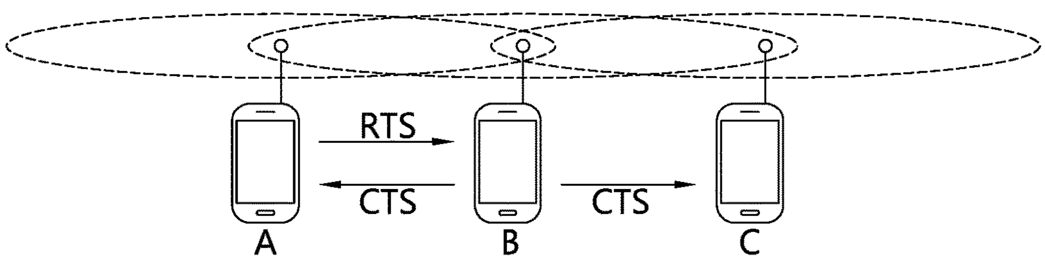
FIG. 10 is a drawing for explaining request to send (RTS) and clear to send (CTS).
Figure 10:
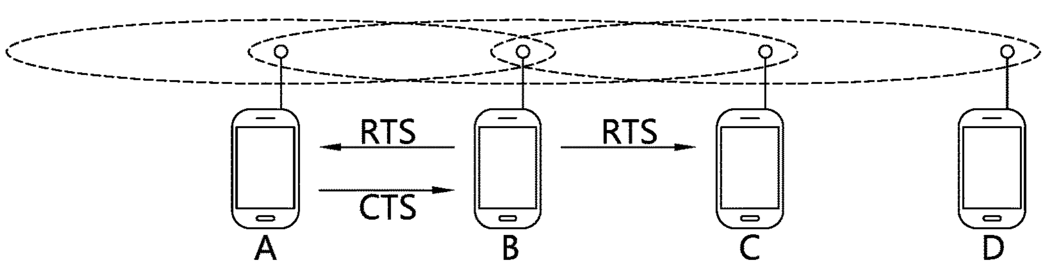

FIG. 10 is a drawing for explaining request to send (RTS) and clear to send (CTS). FIG. 10(*a*) shows an example of a method for solving a hidden node problem, and FIG. 10(*b*) shows an example of a method for solving an exposed node problem.

A short signaling packet such as the RTS, the CTS, or the like may be used to effectively use a collision avoidance mechanism in an exemplary situation as shown in FIG. 9. The RTS/CTS between two STAs may allow a neighboring STA(s) to perform overhearing, and thus the neighboring STA(s) may be allowed to consider whether to transmit information between the two STAs. For example, when an STA which intends to transmit data transmits an RTS frame to an STA for receiving the data, the STA for receiving the data may transmit a CTS frame to neighboring STAs to inform that the STA will receive the data.

In FIG. 10(*a*), it is assumed that the STA A and the STA B intend to transmit data to the STA B. If the STA A sends the RTS to the STA B, the STA B transmits the CTS to the STA A and STA C which are neighboring to the STA B. As a result, the STA C waits until data transmission of the STA A and the STA B ends, thereby being able to avoid collision.

In FIG. 10(*b*), since the STA C overhears RTS/CTS transmission between the STA A and the STA B, the STA C may determine that collision will not occur even if the STA C transmits data to another STA (e.g., the STA D). That is, the STA B transmits the RTS to all neighboring STAs, and only the STA A which has data to be actually transmitted transmits the CTS. Since the STA C receives only the RTS and does not receive the CTS of the STA A, it may be known that the STA A is beyond carrier sensing of the STA C.

Hereinafter, an LTE service in an unlicensed band is described.

A licensed band guarantees higher reliability and communication quality than those of an unlicensed band as a shared resource, since the exclusive right to use the licensed band is assigned to a single service provider. However, enormous costs are expended in securing a licensed band through spectrum auctions or the like, and securing an additional frequency is absolutely needed in order to deal with the current demand for data. As a solution, an LTE service in an unlicensed band (LTE on unlicensed spectrum (LTE-U)) has been proposed.

Figure 11:
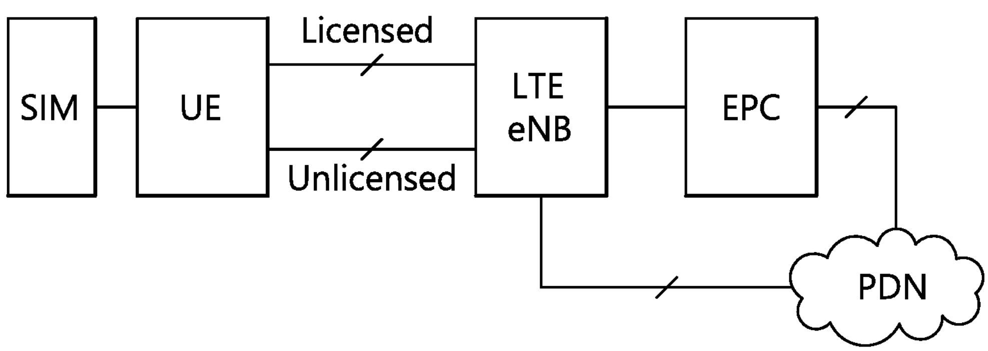
FIG. 11 shows a network configuration in which licensed and unlicensed bands are integrated.

LTE-U can provide improved mobility, security, and communication quality by extending advantages of LTE to an unlicensed band and can increase data throughput due to higher frequency efficiency of LTE than that of existing radio access technologies. Further, referring to FIG. 11, which illustrates a network in which licensed and unlicensed bands are integrated, LTE-U is fairly advantageous in terms of investment and management costs in that licensed and unlicensed bands can be managed as a single integrated network without significantly alterations to an existing core network.

However, since transmission output is generally restricted in an unlicensed band, an unlicensed band mostly provides smaller coverage than a licensed band that can be exclusively used, even though the unlicensed band is the same frequency band as the licensed band. Further, to comply with regulations set to minimize interference with other communication modes or communication devices of other service providers also present in the same frequency band, uniform levels of services may not be guaranteed in a certain area. Further, when service coverage is established based on an existing cellular mode using an unlicensed band, reliability in the transmission of an important signal, which needs to be transmitted through a control channel or the like, may not be sufficiently ensured. To avoid these problems and to maximally bring advantages of an unlicensed band, it is proposed to use an unlicensed band for CA in combination with an LTE service in a licensed band or as a supplement downlink (SDL).

Signal transmission, which needs to have guaranteed reliability to provide LTE services, such as network management, radio resource allocation, UE mobility control, and the like, is achieved through LTE in a licensed band serving as a primary component carrier (PCC). However, LTE in an unlicensed band may accommodate both a scenario for supporting both an uplink and a downlink and a scenario for supporting a downlink only, but always serves as a secondary component carrier (SCC) and operates in a manner for improving performance, such as cell capacity and average data rate per user, by supplementing an LTE service on a PCC. In a scenario where an LTE service in an unlicensed band is provided via integration with an LTE service in a licensed band, cross-carrier scheduling technology, security and QoS guaranteeing technology, or the like, which can be achieved in CA between licensed bands, may be applied and the performance of an LTE service in an unlicensed band, which is relatively vulnerable to interference, may be supplemented through inter-cell interference coordination (ICIC).

A key issue of LTE-U services is a fairness problem caused by coexistence with existing radio access technologies in an unlicensed band, especially WLAN technology. Since LTE and WLAN technologies are fundamentally different in PHY/MAC architecture, if these technologies coexist in a single band, a fairness problem may seriously arise in that services are concentrated only in LTE. That is, LTE can share a frequency using an OFDMA scheme, whereas a WLAN employs CSMA/CA and thus cannot share a channel but waits until the channel is idle. Thus, it is highly likely that communication is performed mainly via LTE. To solve this problem, a Listen Before Talk (LBT) mechanism for checking the presence of other communication radio waves that may cause interference in a corresponding band may be applied.

Figure 12:
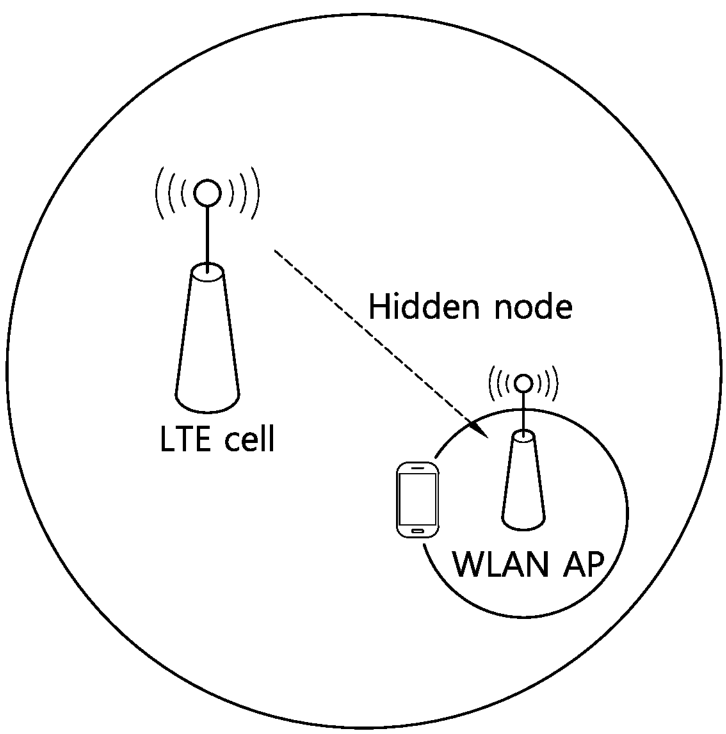
FIG. 12 shows a hidden node problem which occurs in an environment where an unlicensed LTE cell and a WLAN AP co-exist.

FIG. 12 shows a hidden node problem which occurs in an environment where an unlicensed LTE cell and a WLAN AP co-exist.

Referring to FIG. 12, it is assumed that a UE and a WLAN AP exist in coverage of the unlicensed LTE cell, and the UE exists in coverage of the WLAN AP.

According to one embodiment, it is assumed that the LTE cell is transmitting information to the UE, and the WLAN AP has information to be transmitted to the UE. In this case, even if the LTE cell is transmitting the information to the UE, transmission of the LTE cell may not be able to be sensed as a location of the WLAN AP. Therefore, the UE may receive information simultaneously from the LTE cell and the WLAN AP, which may lead to collision.

According to another embodiment, it is assumed that the WLAN AP is transmitting information to the UE, and the LTE cell has information to be transmitted to the UE. In this case, even if the WLAN AP is transmitting the information to the UE, transmission of the WLAN AP may not be sensed at a location of the LTE cell. Therefore, the UE may receive information simultaneously from the WLAN AP and the LTE cell, which may lead to collision.

In order to solve the aforementioned collision, it may be considered to use an RTS/CTS procedure in the environment where the unlicensed LTE cell and the WLAN AP co-exist. For example, if the UE receives RTS from the WLAN AP, the UE may transmit CTS to a device which exists in coverage of the UE. However, when coverage of the CTS is considered, the LTE cell may not be able to receive the CTS from the UE.

As described in the aforementioned example, the hidden node problem may occur in the environment where the unlicensed LTE cell and the WLAN AP co-exist, and the conventional RTS/CTS procedure may not be able to solve the aforementioned problem. Therefore, the present invention proposes a method for solving the aforementioned problem which may occur in the environment where the unlicensed LTE cell and the WLAN AP co-exist, and an apparatus supporting the method.

Hereinafter, a method of receiving data by a UE on an unlicensed band in a wireless communication system, and an apparatus supporting the method are described according to an embodiment of the present invention. In the embodiment of the present invention, a first indicator may be an indicator indicating a presence of data to be transmitted from a BS to the UE. A second indicator may be an indicator indicating that it is possible for the UE to receive data. A third indicator may be an indicator indicating that it is impossible for the UE to receive data. A fourth indicator may be an indicator indicating whether transmission of the second indicator is necessary. A fifth indicator may be an indicator indicating a presence of data to be transmitted from the BS to the UE. The first indicator and the fifth indicator may be distinguished from each other. A method of receiving data by the UE on the unlicensed band may include the following steps.

(1) First Step

When the BS desires to perform data transmission on the unlicensed band, the BS may transmit the first indicator through at least any one of an LTE cell on an unlicensed frequency, an LTE cell on a licensed frequency, and a WLAN. The first indicator may indicate a presence of data to be transmitted from the BS to the UE. The first indicator may be request to send (RTS). The first indicator may be transmitted by being included in at least any one of an RRC message, a MAC control element, and a PDCCH.

In addition, the BS may transmit the fourth indicator indicating whether the second indicator needs to be transmitted to the BS through at least any one of the LTE cell on the unlicensed frequency, the LTE cell on the licensed frequency, and the WLAN. The second indicator may indicate that it is possible for the UE to receive data. The second indicator may be clear to send (CTS).

In addition, the BS may transmit a timer value related to transmission of the second indicator. The timer value may be used to determine a success or failure of channel sensing in the following step.

(2) Second Step

After receiving the first indicator through the WLAN or a serving LTE cell, the UE may perform the channel sensing.

If the UE determines that a channel is clear (i.e., if it is determined that the channel is not in use) as a result of performing the channel sensing, the UE may transmit the second indicator by using at least any one of a WLAN module and an LTE module. The UE may use the LTE module to inform the BS of a success in transmission of the second indicator. The success in transmission of the second indicator may be informed through at least any one of the LTE cell on the unlicensed frequency and the LTE cell on the licensed frequency. If the fourth indicator is received from the BS, the second indicator may be transmitted only when the fourth indicator indicates that transmission of the second indicator is necessary. For example, if the fourth indicator indicates that transmission of the second indicator is unnecessary, the UE may not transmit the second indicator even if the UE determines that the channel is clear as the result of performing the channel sensing.

If the UE determines that the channel is not clear (i.e., determines that the channel is in use) as the result of performing the channel sensing, the UE may not transmit the second indicator (e.g., a result of LBT). The UE may use the LTE module to inform the BS of a failure in transmission of the second indicator. The failure in transmission of the second indicator may be informed by transmitting the third indicator to the BS. The third indicator may indicate that it is impossible for the UE to receive data. The third indicator may be informed through at least any one of the LTE cell on the unlicensed frequency and the LTE cell on the licensed frequency.

The channel sensing may be performed in a duration in which a timer runs. The timer may be initiated after the UE receives the first indicator. Further, the initiated timer may expire after time elapses by a timer value received from the BS. If the channel is not clear until the timer expires, the UE may transmit the third indicator after the timer expires. On the contrary, if the channel is clear, the UE may transmit the second indicator even before the timer expires.

(3) Third Step

If the BS receives the second indicator from the UE, an SCell on the unlicensed band may start data transmission for the UE.

If the BS receives the third indicator from the UE, the BS may not perform data transmission for the UE. In addition, the BS may transmit the fifth indicator in response to the third indicator. The fifth indicator may indicate a presence of data to be transmitted to the UE. The fifth indicator may be RTS. However, a receiver address of the first indicator may be different from a receiver address of the fifth indicator.

A hidden node problem which occurs in an environment where an LTE cell and a WLAN AP co-exist can be solved by indicating whether data reception is possible by the UE to the BS (e.g., by transmitting the second indicator or transmitting the third indicator) in response to the first indicator indicating a presence of data to be transmitted to the UE.

Figure 13:
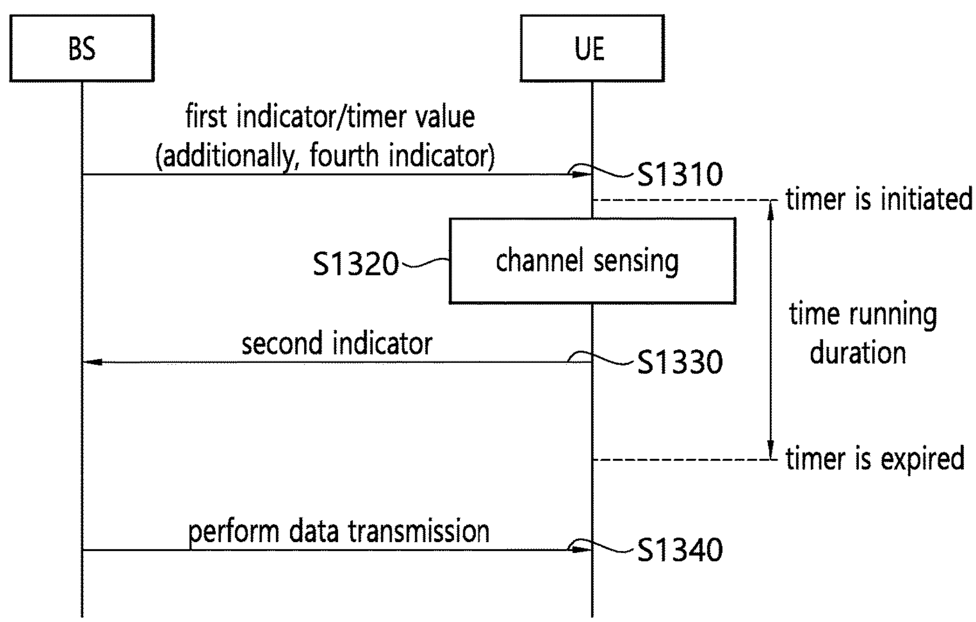
FIG. 13 shows a method of indicating that it is possible for a UE to receive data on an unlicensed band according to an embodiment of the present invention.

FIG. 13 shows a method of indicating that it is possible for a UE to receive data on an unlicensed band according to an embodiment of the present invention.

Referring to FIG. 13, a BS may transmit a first indicator and a timer value to a UE (S1310). The first indicator may be an indicator indicating a presence of data to be transmitted from the BS to the UE. Additionally, the BS may transmit a fourth indicator to the UE. The fourth indicator may be an indicator indicating whether transmission of a second indicator is necessary. The first indicator may be transmitted through at least any one of a WLAN and an LTE cell. The fourth indicator may be transmitted through at least any one of the WLAN and the LTE cell.

After receiving the first indicator, the UE may perform channel sensing (S1320). The channel sensing may be performed in a duration in which a timer runs. The duration in which the timer runs may be a duration from when a timer starts until the timer expires. The UE may initiate the timer upon receiving the first indicator. Alternatively, the UE may initiate the timer after receiving the first indicator. The timer may expire after time elapses by a timer value received from the BS. In the embodiment of FIG. 13, it is assumed that a corresponding channel is not in use as a result of performing the channel sensing. That is, the corresponding channel is clear.

If it is determined that the corresponding channel is not in use as the result of performing the channel sensing by the UE, the UE may transmit the second indicator to the BS (S1330). The second indicator may be an indicator indicating that it is possible for the UE to receive data. The second indicator may be transmitted through at least any one of an LTE cell on an unlicensed frequency and an LTE cell on a licensed frequency. The second indicator may be transmitted by using at least any one of a WLAN module and an LTE module. The second indicator may be transmitted even before the timer expires. The second indicator may be transmitted only when the fourth indicator indicates that transmission of the second indicator is necessary. For example, if the fourth indicator indicates that transmission of the second indicator is unnecessary even if the UE determines that the corresponding channel is not in use, the second indicator may not be transmitted.

After receiving the second indicator, the BS may transmit data to the UE through a corresponding channel (S1340).

Figure 14:
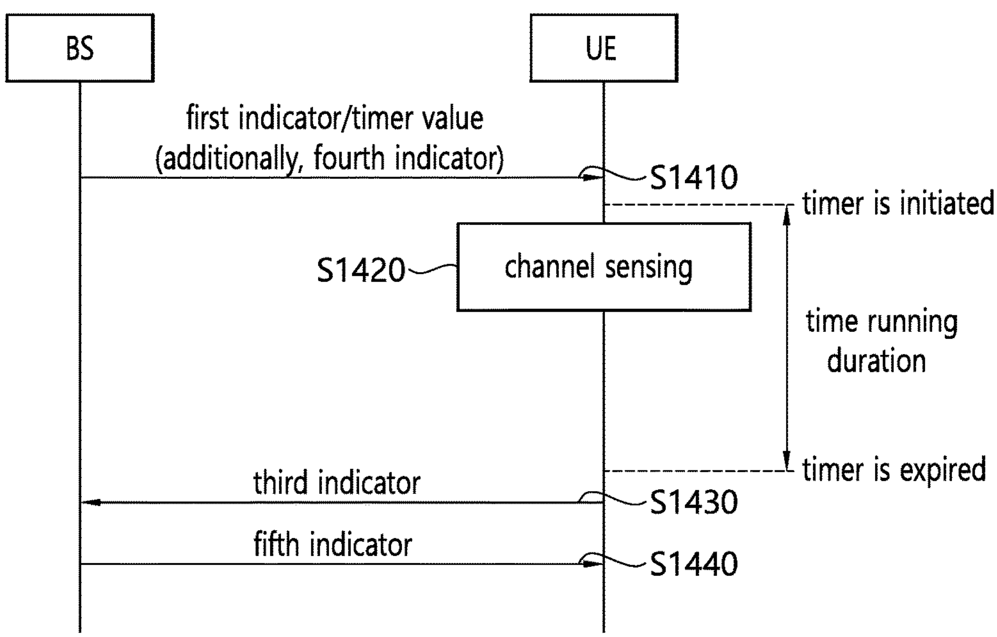
FIG. 14 shows a method of indicating that it is impossible for a UE to receive data on an unlicensed band according to an embodiment of the present invention.

FIG. 14 shows a method of indicating that it is impossible for a UE to receive data on an unlicensed band according to an embodiment of the present invention.

Referring to FIG. 14, a BS may transmit a first indicator and a timer value to a UE (S1410). The first indicator may be an indicator indicating a presence of data to be transmitted from the BS to the UE. Additionally, the BS may transmit a fourth indicator to the UE. The fourth indicator may be an indicator indicating whether transmission of a second indicator is necessary. The first indicator may be transmitted through at least any one of a WLAN and an LTE cell. The fourth indicator may be transmitted through at least any one of the WLAN and the LTE cell.

After receiving the first indicator, the UE may perform channel sensing (S1420). The channel sensing may be performed in a duration in which a timer runs. The duration in which the timer runs may be a duration from when a timer starts until the timer expires. The UE may initiate the timer upon receiving the first indicator. Alternatively, the UE may initiate the timer after receiving the first indicator. The timer may expire after time elapses by a timer value received from the BS. In the embodiment of FIG. 14, it is assumed that a corresponding channel is in use as a result of performing the channel sensing. That is, the corresponding channel is not clear.

After the timer expires, the UE may transmit a third indicator to the BS (S1430). The third indicator may be an indicator indicating that it is impossible for the UE receive data. The third indicator may be transmitted through at least any one of an LTE cell on an unlicensed frequency and an LTE cell on a licensed frequency. Alternatively, if the timer expires, the UE may not transmit any indicator to the BS.

After receiving the third indicator, the BS may transmit a fifth indicator to the UE (S1440). The fifth indicator may be an indicator indicating a presence of data to be transmitted from the BS to the UE. The first indicator and the fifth indicator may be distinguished from each other. Alternatively, if the indicator is not received from the UE after the timer expires, the BS may transmit the fifth indicator to the UE.

Figure 15:
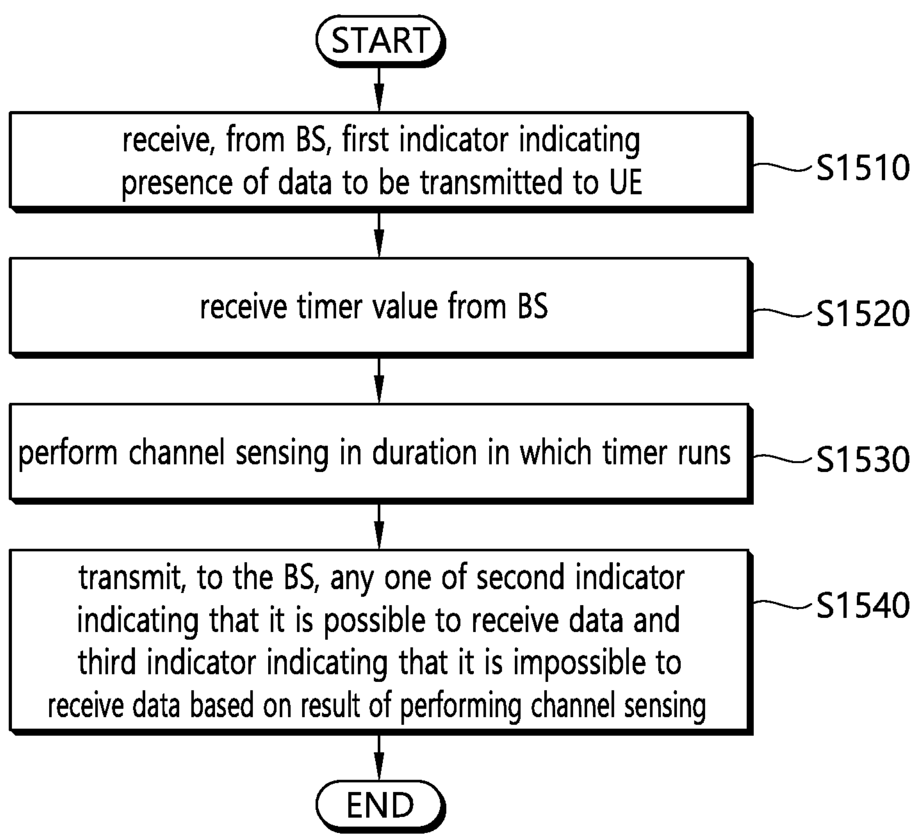
FIG. 15 is a flowchart for a method of receiving data by a UE on an unlicensed band according to an embodiment of the present invention.

FIG. 15 is a flowchart for a method of receiving data by a UE on an unlicensed band according to an embodiment of the present invention.

Referring to FIG. 15, the UE may receive, from a BS, a first indicator indicating a presence of data to be transmitted to the UE (S1510). The first indicator may be received by being included in at least any one of an RRC message, a MAC control element, and a PDCCH. The first indicator may be received through at least any one of a WLAN and an LTE cell.

The UE may receive a timer value from the BS (S1520).

The UE may perform channel sensing in a duration in which a timer runs (S1530). The timer may be initiated after the UE receives the first indicator, and the initiated timer may expire after time elapses by the timer value.

The UE may transmit, to the BS, any one of a second indicator indicating that it is possible to receive data and a third indicator indicating that it is impossible to receive data on the basis of the result of performing the channel sensing (S1540).

If it is determined that a channel is not in use as the result of performing the channel sensing, the UE may transmit the second indicator to the BS. The second indicator may be transmitted by using at least any one of a WLAN module and an LTE module. The UE may receive data from the BS through an SCell on an unlicensed band in response to the second indicator.

The UE may receive a fourth indicator indicating whether transmission of the second indicator is necessary. The second indicator may be transmitted only when the fourth indicator indicates that transmission of the second indicator is necessary. The fourth indicator may be received through at least any one of a WLAN and an LTE cell.

If it is determined that a channel is in use as the result of performing the channel sensing, the UE may transmit the third indicator to the BS. The third indicator may be transmitted after the timer expires. The third indicator may be transmitted to the BS through an LTE cell on an unlicensed frequency or a licensed frequency by using an LTE module. In this case, the second indicator may not be transmitted to the BS.

The UE may receive from the BS a fifth indicator indicating a presence of data to be transmitted to the UE in response to the third indicator. A receiver address of the first indicator and a receiver address of the fifth indicator may be different from each other.

Figure 16:
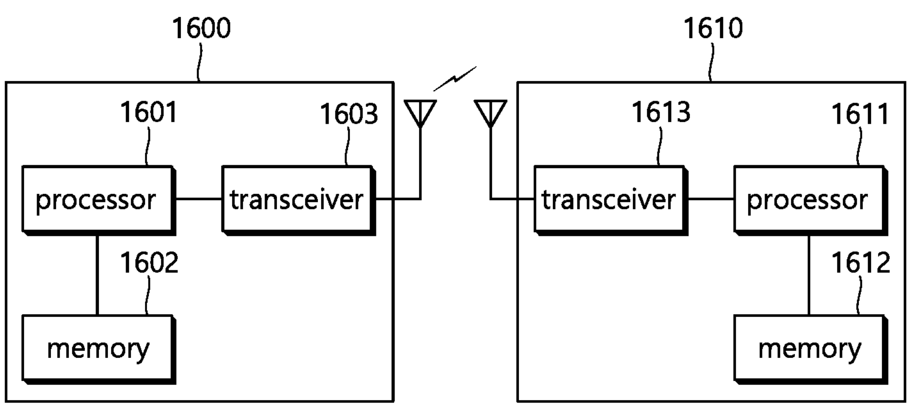
FIG. 16 is a block diagram illustrating a wireless communication system according to the embodiment of the present invention.

FIG. 16 is a block diagram illustrating a wireless communication system according to the embodiment of the present invention.

A BS 1600 includes a processor 1601, a memory 1602 and a transceiver 1603. The memory 1602 is connected to the processor 1601, and stores various information for driving the processor 1601. The transceiver 1603 is connected to the processor 1601, and transmits and/or receives radio signals. The processor 1601 implements proposed functions, processes and/or methods. In the above embodiment, an operation of the base station may be implemented by the processor 1601.

A UE 1610 includes a processor 1611, a memory 1612 and a transceiver 1613. The memory 1612 is connected to the processor 1611, and stores various information for driving the processor 1611. The transceiver 1613 is connected to the processor 1611, and transmits and/or receives radio signals. The processor 1611 implements proposed functions, processes and/or methods. In the above embodiment, an operation of the UE may be implemented by the processor 1611.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of transmitting information by a user equipment (UE) on an unlicensed band in a wireless communication system, the method comprising:

receiving, from a base station (BS), first information indicating whether there is data to be transmitted to the UE;

receiving, from the BS, second information informing the UE whether transmission of third information is necessary;

receiving a timer value from the BS;

performing channel sensing in a duration in which a timer runs; and transmitting, to the BS, either the third information or fourth information based on a result of the channel sensing, wherein the third information informs the BS that it is possible for the UE to receive data, and wherein the fourth information informs the BS that it is impossible for the UE to receive the data.

2. The method of claim 1, further comprising:

transmitting, by the UE to the BS, the third information when the UE determines that a channel is not in use as the result of performing the channel sensing.

3. The method of claim 2, wherein the third information is transmitted by using at least one of a WLAN module or an LTE module.

4. The method of claim 1, wherein the third information is transmitted only when the second information informs the UE that transmission of the third information is necessary.

5. The method of claim 1, wherein the second information is received via at least one of a WLAN or an LTE cell.

6. The method of claim 1, further comprising:

receiving, by the UE from the BS, data via an SCell on the unlicensed band in response to the third information.

7. The method of claim 1, further comprising:

transmitting, by the UE to the BS, the fourth information when the UE determines that a channel is in use as the result of the channel sensing.

8. The method of claim 7, wherein the timer is initiated after the UE receives the first information, and wherein the initiated timer expires after an amount of time, defined by the timer value, elapses.

9. The method of claim 8, wherein the fourth information is transmitted after the timer expires.

10. The method of claim 9, wherein the fourth information is transmitted to the BS by using an LTE module via an LTE cell on an unlicensed frequency or a licensed frequency.

11. The method of claim 7, further comprising:

receiving, by the UE from the BS, fifth information indicating whether there is data to be transmitted to the UE in response to the fourth information, wherein a receiver address of the first information and a receiver address of the fifth information are different from each other.

12. The method of claim 7, wherein the third information is not transmitted to the BS.

13. The method of claim 1, wherein the first information is received in at least one of an RRC message, a MAC control element, or a PDCCH.

14. A user equipment (UE) for transmitting information on an unlicensed band in a wireless communication system, the UE comprising:

a memory; a transceiver; and a processor operatively coupled to the memory and the transceiver, wherein the processor is configured to:

control the transceiver to receive, from a base station (BS), first information indicating whether there is data to be transmitted to the UE;

control the transceiver to receive, from the BS, second information informing the UE whether transmission of third information is necessary;

control the transceiver to receive a timer value from the BS;

perform channel sensing in a duration in which a timer runs; and control the transceiver to transmit, to the BS, either the third information or fourth information based on a result of channel sensing, wherein the third information informs the BS that it is possible for the UE to receive data, and wherein the fourth information informs the BS that it is impossible for the UE to receive the data.

* * * * *